May 4, 1954  F. C. SCHWANEKE  2,677,401

COUPLING

Filed Sept. 25, 1948

Inventor:
Fred C. Schwaneke
By Watson D. Harbaugh
atty

Patented May 4, 1954

2,677,401

UNITED STATES PATENT OFFICE 2,677,401

COUPLING

Fred C. Schwaneke, Chicago, Ill., assignor to Dormeyer Corporation, Chicago, Ill., a corporation of Illinois Application September 25, 1948, Serial No. 51,269

4 Claims. (Cl. 146—1)

This invention relates generally to couplings and more particularly to a quickly detachable drive coupling for supporting rotating members in aligned drive relationship.

The coupling of this invention is further characterized by the fact that a rotatable driving member is coupled to a rotatable driven member, each of the members being journalled in a stationary element, the rotatable elements engaging in drive relationship after the two stationary elements engage each other in non-rotatable relationship.

Although this invention is illustrated as used in conjunction with a food mixer to connect a fruit juicer to a power take-off shaft, it is not limited to such usage since it serves for other purposes such as attachment of flexible shafts to motors, of rotary tools to flexible shafts or other driving shafts, etc.

Although mating female and male supports for drive shafts can be broached and turned to shapes and tolerances for relative non-rotatable engagement even when made out of cored castings, such is expensive and very often impossible since the female portion is a blind hole. Permitting the castings such as die castings to be used without machining encounters the difficulty that clearance tolerances vary with die wear in a direction ultimately preventing engagement.

Moreover, if the cast surfaces are not machined but the shaft journalling surfaces are, eccentricities are encountered which cause misalignment, wabbling and loss of power.

Consequently, another object of the invention is to provide an improved quickly detachable coupling in which one of the shafts is journalled in a base whose outer surface is machined concentric with the journal and is received in a socket whose mating wall is reamed concentric with a smaller diameter journal and to close tolerances with the base.

A further object is to provide a coupling suitable for use in a food mixer to permit various food working devices to be driven thereby which is simple to machine for concentricity and close tolerances so that detachable food working devices may be attached and removed very quickly by one unskilled in mechanical devices yet fit snugly enough to operate like an integral assembly.

Another object is to provide a coupling for use in food mixers which not only serves to transmit rotary motion to food working devices, but which also serves to lead into and support the devices in a properly oriented working position, it being impossible to insert a device upside down or at a wrong angle.

A further object is to provide a coupling having a stationary machined cylindrical socket element and a mating machined cylindrical member receivable in said socket, said element having a stationary pin disposed chordal to and partially intersecting the cylindrical socket to a depth less than the diameter of the pin and said mating member being flattened on one side so as to cooperate with said pin to prevent relative rotation of the two members.

A further object is to provide a socket having a wall defining a surface of revolution which is accurately and easily machined to receive chordal thereto a pin to prevent rotation of a matching member receivable in the socket.

The invention is also characterized by a round chordal pin intersecting a socket a distance less than its diameter so that the surface thereof serves as an incline to guide a flattened base into engagement prior to the time drive shafts engage which are carried thereby.

Other objects and advantages of the invention will be apparent from the following description and the accompanying drawings in which.

Figure 1:
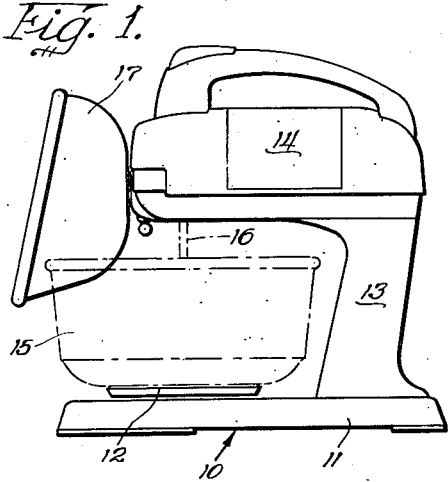
Fig. 1 is an elevation showing a food mixer and juicer attachment equipped with the coupling of this invention.

In Fig. 1 a food mixer 10 is shown provided with a coupling embodying the invention. The food mixer comprises a base 11 having a bowl supporting turntable 12 at one end and a pedestal 13 at the other end. A power unit 14 containing a motor (not shown) is mounted on top of the pedestal 13.

A large mixing bowl 15 available for use and a pair of beaters 16 are shown in broken lines in their usual positions. However, with the particular mixer 10 shown, the beaters 16 and bowl 15 are preferably removed during operation of attachments such as grinders, shredders, juicers, etc., in order to provide more work space.

Figure 2:
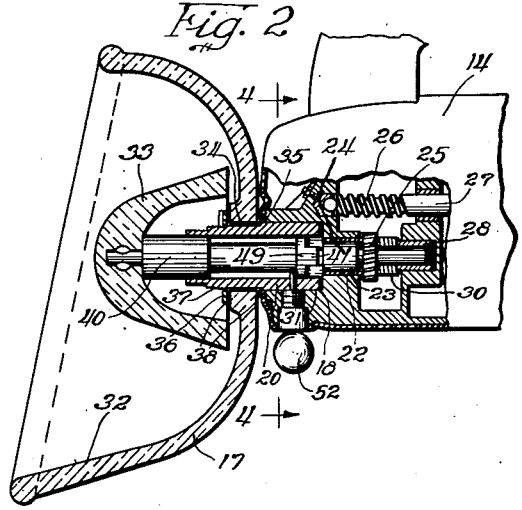
Fig. 2 is an enlarged view partially in section showing the coupling.

The juicer 17 or other attachments are mounted on the front end of the power unit 14 by the coupling of this invention. As shown in Fig. 2, a power take-off socket 18 is preferably cast in the front end of the power unit 14 and reamed preferably to a cylindrical surface of revolution. This socket receives a cylindrical member 20 which carries the various elements of the juicer 17 and which is turned down preferably to a cylindrical surface of revolution.

The inner end 22 of the socket 18 is smaller in diameter and is reamed concentrically with the socket 18 to receive a sleeve bearing 23 which is preferably pressed therein. The driving shaft 24 of the coupling is journalled in the bearing 23, and carries a worm wheel 25 which is driven ultimately through gearing from a worm 26 on the motor shaft 27. The rear end of the shaft 24 is journalled in the bearing 28 which is also reamed concentrically with the socket 18 and bears the end thrust of the worm drive, through a collar 30 running against the bearing 28.

The front end of the shaft 24 is enlarged and diametrally kerfed to provide a rectangular slot 31 across its end face to drive mating shafts inserted in the socket.

The juicer 17 which is to be driven by the shaft 24 as representative of other devices comprises a glass bowl 32 and a reamer 33. The bowl 32 has a central opening 34 through which one end of the member 20 passes to receive the bowl in supported relation rigidly against a shoulder 35 and a locking nut 36 which is screwed onto a thread 37. Rubber gaskets 38 are employed between the shoulder 35, the bowl, and the nut 36.

The reamer 33 is rigidly attached to one end of a shaft 40 which is journalled in the member 20. The inside and outside of the member 20 are machined cylindrically and concentrically. The inner surface serves as a bearing for the shaft 40. The end of this shaft adjacent to the reamer 33 is substantially the same diameter as the inside of the cylinder 20, as is the opposite end portion of the shaft 40. Thus, the shaft 40 is journalled at each end. The other end of the shaft 40, remote from the reamer 33, is milled so as to leave a transverse projecting portion or tang 41 which mates with and is received in the rectangular slot 31 provided in the end of the member 24. Thus a clutch face is provided on each of the shafts for coupling them together to transmit rotary motion. The corners of the projecting portion 41 are preferably chamfered to provide for easy entrance into the slot 31.

Figure 6:
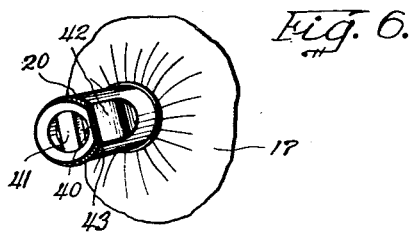
Fig. 6 is a perspective view of the driven portion of the coupling.

As already mentioned the outer surface of the member 20, which is received in the socket 18, is cylindrical. This is true except for a portion on one side which is milled off a short distance back from the end to provide a flat 42 on one side as shown in Fig. 6. The inner end of this flat 42 is chamfered as indicated at 43 and cooperates with a pin 44 preferably a round steel pin, received in a hole 45 drilled in the body 21 chordal to the socket 18. The arrangement of the pin 44 is such that it intersects the inside wall of the socket 18, a portion of it actually passing through the socket and defining a chord. The pin 44 is so located as to lead into and bear against the flat 42 on the side of the member 20 when the member is inserted in the socket 18 to prevent relative rotation. The pin 44 and flat 42 also perform an additional function in that they make it possible to insert the member 20 into the socket 18 in any position except that in which the locking means, as will be described later, is in proper alignment.

The above described construction gives rise to several advantages. Chief among them is the fact that the machining with snug tolerances and perfect concentricity between the coupling is greatly simplified and improved. In the embodiment shown, the socket 18 is cast slightly under size when the body 21 is die cast. A special reamer is then inserted into the socket 18 and the surfaces which support the bearings 23 and 28, as well as the side wall of the socket proper are simultaneously reamed. Thus, all three of the surfaces are accurately machined and lie about the same axis. The hole 44 is then drilled, the body 21 being inserted in a fixture for this purpose, and the steel pin 45 is inserted, its inner edge defining a chord which intersects the cylindrical wall of the socket 18. Thus, a socket which is truly cylindrical and which is accurately aligned with the axis of the shaft bearings, but which has a flat side thereon, results.

The member 20, which is receivable in the socket 18, is also easily and accurately formed, the inner and outer cylindrical surfaces being cut on a lathe and the flat portion 42 then being milled to the proper depth and length as determined from the axis of the cylindrical surface of the member. Thus, the member 20 and the socket 18 are accurately formed to correspond and to mate with each other, and alignment of the shafts 24 and 40 is assured. The flat extends only far enough to accommodate the pin. The remainder of the member 20 provides a snug cylindrical fit all around. Furthermore, the pin is spaced outwardly from the shaft 24 so that the flat and pin engage before the shafts so that power twisting of the attachment is prevented in the hands of the user.

Figure 3:
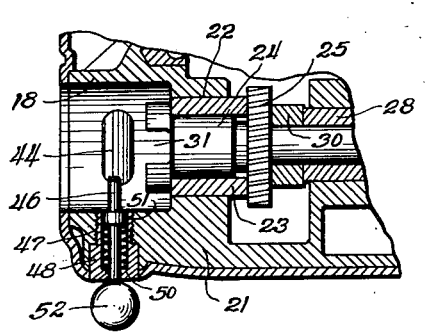
Fig. 3 is an enlarged view similar to Fig. 2 but with the juicer removed.
Figure 4:
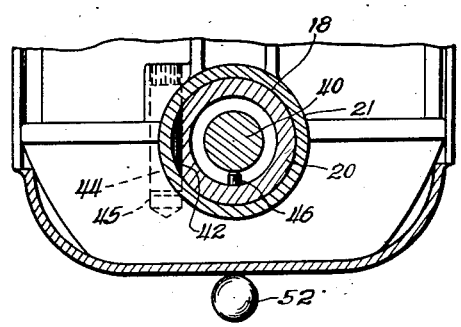
Fig. 4 is a vertical section through the coupling taken on a plane perpendicular to the axis of shaft rotation.
Figure 5:
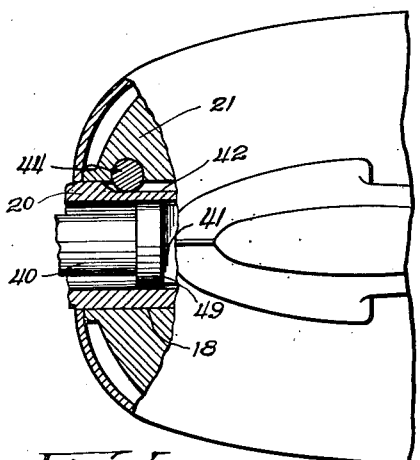
Fig. 5 is a top view partially in section showing a portion of the coupling.

A spring loaded detent member 46 is provided to hold the juicer 17 in working position, and to lock the shaft 40 in the engaged position. The member 46 is supported in a threaded opening 47 provided in a member 21 being housed in a sleeve 48 which is screwed into the opening 47. A spring 50 bearing against a shoulder 51 on the member 46 and the bottom of the sleeve 48 urges the detent 46 upwardly to the position shown in Fig. 3. The detent 46 is withdrawn by pulling on the ball 52 attached to its lower end to withdraw it from the socket 18. A radial hole 53 is provided through the member 20 and receives the detent 46 when the member is pushed home into the socket 18. Thus, the member 20 is rigidly secured in the socket 18 by the action of the detent 46 and the cooperation between the flat 42 and the pin 44. In order to hold the shaft 40 in engagement, the end portion of the detent 46 is purposely made longer than the thickness of the member 20 so as to project beyond the inner wall of the member 20 in the position shown in Fig. 2. Thus, the side of the detent 46 bears against the rear face of the end portion 49 of the shaft 40 and prevents its withdrawal from the member 20, holding it in engagement with the shaft 24.

To remove the reamer 33 and the shaft 40, the detent 46 is pulled downwardly a slight distance so that the shaft 40 is released, but the member 20 is still locked in place. This permits the reamer and shaft to be withdrawn, the member 20 and the bowl 32 remaining in the supported position. To remove the bowl 32, the detent 46 is pulled all the way down releasing the member 20 which is then withdrawn by pulling outwardly on the bowl. The juicer may be withdrawn as a unit by merely pulling the detent 46 all the way down and pulling outwardly on the bowl 32. However, in most instances it is preferred to remove it in two steps since the reamer and the bowl are more easily washed when separated.

Similarly, the juicer attachment 17 may be assembled and coupled to the power unit 14 in either one operation or two operations. The preferred method of assembly is to insert the reamer in the juicer bowl, the shaft 40 being received in the member 20, and then to push the two into full engagement while holding the detent 46 in the withdrawn position. This is done while the motor is running and the drive shaft 24 is turning. In fact, this is preferred for the projection 41 slips into the slot 31 as soon as the motor has rotated the slot into alignment with the tank 41. When desired, however, the juicer bowl may be installed on the power unit and locked in place with the detent before the reamer is inserted.

If the flat 42 on the side of the member 20 and the pin 44 were not provided, it would be quite dangerous to insert the juicer assembly 17 while the motor was running, for the rotation of the shafts 24 and 40 would tend to rotate the member 20 and the juicer bowl 32 making alignment of the detent 46 and the hole 53 quite difficult. Furthermore, this rotative force would develop a binding action making it difficult to release the detent 46.

In some instances it may prove desirable to employ a frusto-conical socket and mating member together with the chordal pin and flat which prevent rotation. When this is done, it is preferred to machine the flat so that its plane surface lies parallel to the axis of shaft rotation. However, the flat may be inclined at the same angle as the conical wall and the assembly function properly.

When the coupling of this invention is used for other purposes than that described, either of the shafts 24 and 40 may be the drive shaft. For example, when a flexible shaft is used to drive a rotary tool such as a grinder or drill, it is preferred to provide a socket in the tool having the driven shaft journalled therein. The flexible shaft is then provided with a bearing member on the end which corresponds in shape to the member 20 and is receivable in the socket. The detent 46 is then mounted in the tool body.

Similarly, the other end of the flexible shaft may be adapted to be received in a matching socket provided at the driving motor. Thus, the two ends of the flexible shaft may be identical so that it is impossible to reverse it.

Other changes or modifications such as will present themselves to those familiar with the art may be made without departing from the spirit of this invention whose scope is commensurate with the following claims.

What is claimed is:

1. In a coupling a food processing tool having a stationary part and a rotating part; a power drive shaft turning at low speed; a socket element surrounding said drive shaft and having a cylindrical recess therein; a pin supported at its ends in said element and intersecting said recess along a chord; a cylindrical member having a flat thereon cooperating with said pin to support the socket element and cylindrical member against relative rotation, said member being attached to the stationary part of said tool and receivable axially in said recess, and having a hole through the wall thereof; a driven shaft journalled in said member freely removable axially therefrom and having a shoulder thereon; interconnecting means on the ends of each of said shafts for connecting same in drive relationship when said member and driven shaft are inserted in said recess; and a retractable detent supported in said socket element, said detent normally projecting into said recess and extending through said hole to a position adjacent the shoulder to lock said member and the driven shaft in said recess and being partially retractable to release said driven shaft from said drive relationship.

2. A coupling comprising an element having a socket therein, a rotatable shaft journalled in said element, a second element receivable in said socket, means upon said elements for securing them against relative rotation, a second shaft journalled in said second element freely removable axially from said second member and having a circumferential groove thereon, clutch means on said shafts for interconnecting them in drive relation when said second element is received in said socket, a pin manually retractable at will supported in a wall of said socket, said pin extending through the wall of said second element to engage in the groove on said second shaft and secure same against axial movement away from said first mentioned shaft, partial retraction of said pin permitting withdrawal of said second shaft independently of the second element.

3. A coupling comprising an element having a socket therein of irregular contour, a rotatable shaft projecting into said socket, a second element removably received in mating relationship with said socket to be supported therein against relative rotation, a second shaft journalled in said second element freely removable axially from said second element and having a circumferential groove around it which is disposed within the confines of said socket when said second shaft and second element are in place in said socket, clutch means on said shafts for interconnecting them when said second element is received in said socket, a detent projecting through a wall of said socket, said detent extending through the wall of said second element and preventing withdrawal of said second shaft therefrom, the relative position of retraction of the detent determining the removability of said second shaft independently of said second element.

4. In a coupling, the combination including a drive shaft rotatable at a low speed, a stationary member having a socket therein surrounding said drive shaft, the end of said shaft extending into said socket, a food processing tool having a hollow projection thereon receivable in said socket in a fixed predetermined relationship of relative rotation, a second shaft journalled at axially spaced points in the hollow projection of said tool and driving a rotating part thereof, a retractable detent supported in said stationary member and projecting into said socket through the wall of said projection and through the wall of said hollow projection, a circumferential recess on said second shaft between said spaced points for receiving the end of said detent to secure the shaft against axial movement, and tang and groove means on the ends of each of said shafts for interconnecting same in drive relationship, said retractable detent obstructing engagement of said tang and groove means until partially retracted when said hollow projection is disposed in said socket to its fullest depth.

References Cited in the file of this patent

UNITED STATES PATENTS

| Number | Name | Date |
|---|---|---|
| 626,227 | Gaylor | June 6, 1899 |
| 814,020 | Clifford | Mar. 6, 1906 |
| 1,112,869 | Tirrell | Oct. 6, 1914 |
| 1,340,845 | Strong | May 18, 1920 |
| 1,407,328 | Glenzer | Feb. 21, 1922 |
| 1,539,439 | Smith | May 26, 1925 |
| 1,997,413 | Fitzgerald | Apr. 9, 1935 |
| 2,063,692 | Martinet | Dec. 8, 1936 |
| 2,262,912 | Behar | Nov. 18, 1941 |